April 21, 1925.　　　　　　　　　　　　　　　1,534,508
O. C. EARP-THOMAS
APPARATUS FOR TESTING SOIL OR SEED
Filed April 17, 1918　　2 Sheets-Sheet 1
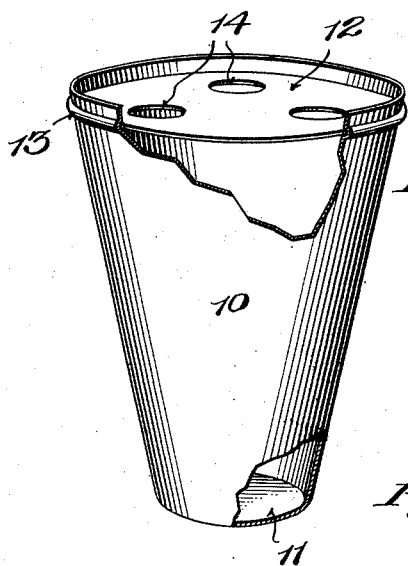
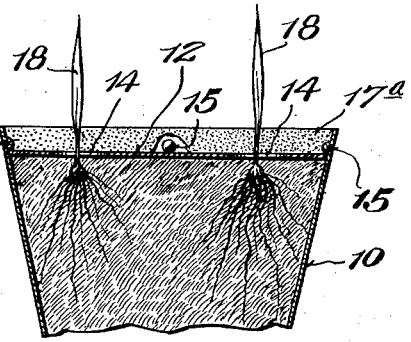
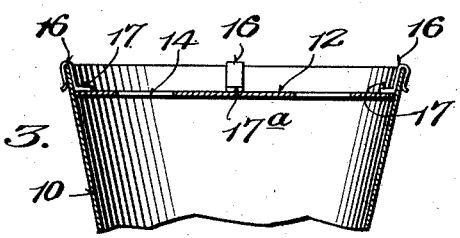
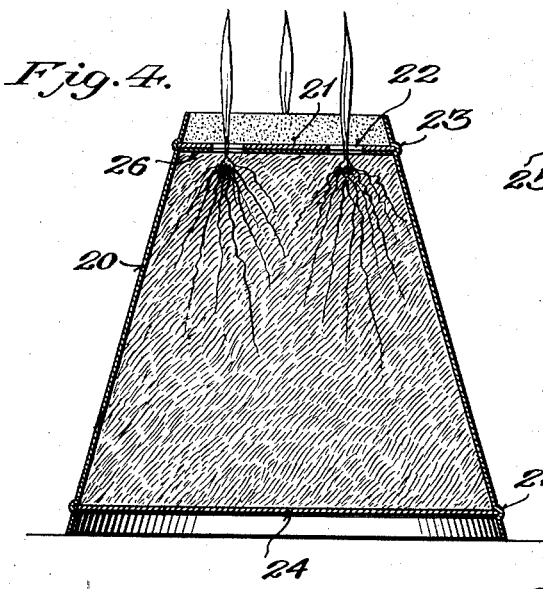
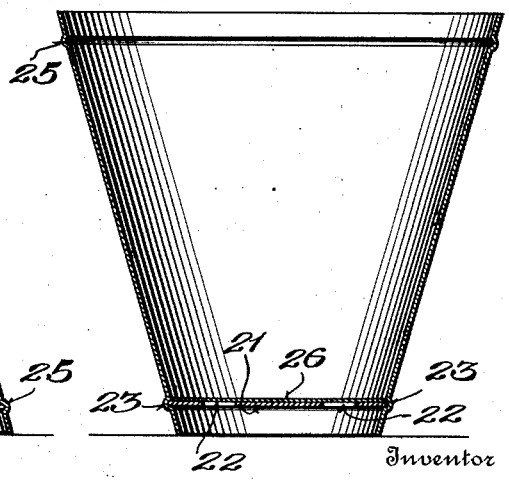
Witness
Chas. L. Grieshaver
Inventor
Oswald C. Earp-Thomas,
By R. F. Steward
his Attorney April 21, 1925.  
O. C. EARP-THOMAS  
1,534,508  
APPARATUS FOR TESTING SOIL OR SEED  
Filed April 17, 1918    2 Sheets-Sheet 2

Inventor  
Oswald C. Earp-Thomas,

Witness

Patented Apr. 21, 1925.

1,534,508

UNITED STATES PATENT OFFICE.

OSWALD CHARLES EARP-THOMAS, OF RICHMOND, VIRGINIA.

APPARATUS FOR TESTING SOIL OR SEED.

Application filed April 17, 1918. Serial No. 229,197.

*To all whom it may concern:*

Be it known that I, OSWALD C. EARP-THOMAS, a citizen of New Zealand (who has declared his intention to become a citizen of the United States), residing at Richmond, in the county of Henrico and State of Virginia, have invented certain new and useful Improvements in Apparatus for Testing Soil or Seed; and I do hereby declare the following to be a full, clear, and exact description of the invention, such as will enable others skilled in the art to which it appertains to make and use the same.

This invention relates to apparatus for testing soil or seed; and it has to do more particularly with a special type of container in which soil may be placed and seed grown under conditions such that the soil in the container is exposed only to a minimum degree to the effect of the external atmosphere, while at the same time conditions for growth of seed in the container during a test are maintained favorable.

In testing different soil mixtures for the purpose of determining the best fertilizer to be employed with a given soil, or in germinating tests of different samples of seed, it is important that the different test specimens all be subjected to as nearly the same conditions in every respect as is possible. Otherwise comparative tests of different samples of soil mixtures or of seed cannot yield reliable results. For example, in determining just what kind of fertilizer or mixture of fertilizers can be employed to best advantage for enriching or correcting a given soil submitted for examination and report, it is desirable that equal portions of the soil be treated with equal quantities of different fertilizers, such as, for instance, a mixed fertilizer, a phosphate, a nitrate, lime, etc., these fertilizing and correcting elements being employed either separately or in various combinations, in conjunction or not with soil improving bacteria such as nitrogen gathering and fixing bacteria, and the like. In order to arrive at approximately correct average results, several samples of each mixture should be tested, and in practice it is customary to run three or more samples of each mixture, and also to run three samples of the untreated soil, as a check. One or more seeds of a lot which are as uniform as possible, are then grown in each test portion or sample, and all the samples are then subjected to as nearly the same temperature and moisture conditions as is possible. It is evident that in conducting tests of the nature described, it is very difficult and practically impossible to entirely eliminate all the variables other than the particular variable which it is desired to determine, namely, the comparative growing power and efficiency in available content of plant food characterizing the untreated soil and the various soil mixtures undergoing test; or, if the comparative vigor and percentage germination of different seed samples is the question involved, practically the same difficulties are involved as in soil testing. Tests of the kind referred to can be carried out with reasonable success and accuracy of results by persons particularly skilled in this line of work. But it is obviously desirable that persons unskilled in scientific or laboratory investigations, and particularly farmers, should be able to make tests for themselves to determine what kind of fertilizer treatment will give best results on their land, or to test the comparative vigor of different samples or varieties of seed which they contemplate sowing. It is evident that tests of this kind cannot be carried on by unskilled persons unless means are provided whereby the variables and sources of experimental error are eliminated to the greatest possible extent.

It is a particular object of this invention to provide testing apparatus which will satisfy this requirement in a simple and practical manner, and which will make it possible for tests of the nature referred to to be carried out with reasonable accuracy and without requiring the exercise of special skill. It is a further object of the invention to provide apparatus of this character which is not only well adapted for employment by unskilled users, but which is also well adapted for use by specialists in soil and seed testing, the character of the novel testing device hereinafter described being such as to render possible the attainment of results by either skilled or unskilled workers which surpass in accuracy and dependability the results attainable by the use of test methods and apparatus heretofore known. Other objects and advantages of the invention will be apparent to those skilled in the art from the description hereinafter given.

Briefly described, the invention contemplates the employment of relatively small testing units in the form of closed containers made of material substantially impervious to air and moisture and provided with one or more apertures through which a seed or seeds may be inserted into a body of soil within the container. With the exception of the aperture or apertures through which the seed is inserted and through which the seedling or seedlings project after germination of the seed, the container is substantially sealed, and consequently the moisture content of the soil within the container is practically unaffected by external atmospheric conditions. Furthermore the test units of which a complete testing set is composed, are substantially identical in shape, capacity, arrangement of seed apertures, etc.; so that the sources of experimental error are reduced to a minimum. In the best embodiment of the invention, the unit containers are frusto-conical in shape and the wall at the larger end is removable, so that the several units comprised in a testing set may be nested together for convenience in handling, and in shipment. In practice these cup-like units may be of any desired size, but as a rule it is convenient to have them about the size of the ordinary tumbler, holding somewhere in the neighborhood of half a pint or so.

The nature of the invention will be best understood from the typical embodiments thereof illustrated in the accompanying drawings forming a part of this specification, in which—

Fig. 1 is a view in elevational perspective, partly broken away, of one construction well adapted to the purposes in view;

Fig. 2 is a fragmentary sectional view of a similar test unit as it appears in actual use, the removable end closure being held in position by a slightly modified arrangement;

Fig. 3 is a fragmentary view in section illustrating still another way of holding the removable top closure in place;

Figs. 4 and 5 are an upright section and an inverted section, respectively, of still another testing cup or unit within the scope of the invention;

Figure 6:
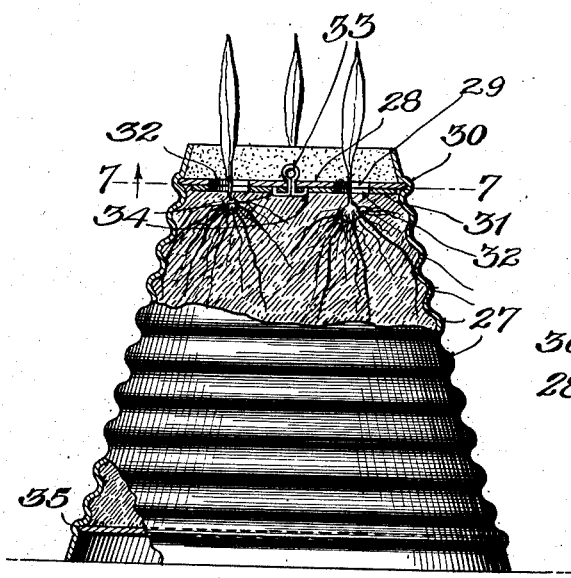
Fig. 6 is an elevation, partly broken away and in section, of an especially desirable type of container similar in a general way to that shown in Figs. 4 and 5 but embodying additional valuable features.

Referring to the drawings, and especially to Fig. 1, the testing unit comprises a frusto-conical body portion 10 and a bottom 11 integral therewith, the cup being seamless and being made of water-proof material of some kind such as paraffined paper or fiber, preferably rather heavy and fairly stiff. Where it is desirable to thoroughly sterilize the container by heat before use, as for example in testing soil mixtures containing bacterial fertilizers, the cup may be made of a metal such as aluminum. The cup is provided with a cover or closure 12 which is adapted to fit the container snugly and to make a substantially tight joint therewith. Various means of effecting this are available, but in the present instance the disk or cover is shown as seating snugly within an annular recess provided by a bead 13 formed near the upper edge of the cup, the material of the cup and its cover disk being sufficiently yielding in character to permit the disk to be sprung into place with its edge in the holding recess so as to form a good joint. This method of holding the removable closure in place is most desirable as a rule. The cover disk is apertured to permit the insertion of one or more seeds into the container. In the present instance three apertures 14 are shown, but the number may vary as desired. These apertures should be sufficiently large to permit a seed such as a grain of wheat or a grain of corn to be inserted without difficulty, and also to permit free growth of the seedling. But the apertures should not be unnecessarily large, and they should be of uniform size both for each individual disk and for the disks of a complete testing set. Where the apertures are of the size and arrangement shown in Fig. 1, they also provide convenient means whereby the cover disk can be removed from the cup when desired.

Figure 8:
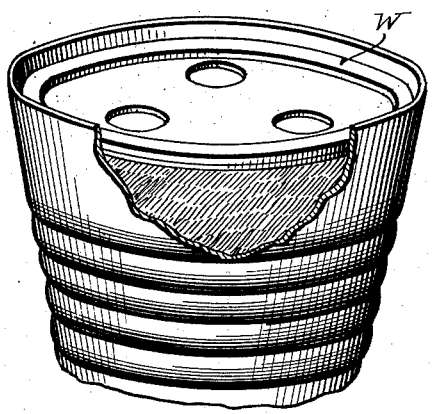
Fig. 8 illustrates means which may be employed to hold any of the various types of top closures in place.

Other means for holding the removable closure in position may be employed. For example, in the arrangement shown in Fig. 2, the cover disk is held in place by means of small projections 15 formed in the sides of the cup at the desired level and projecting inwardly. The cover disk 12 can be sprung into place under these projections and thus firmly held in position. In the arrangement shown in Fig. 3, the cover is held in place by resilient clips 16, which fit over the upper edge of the cup, each having a foot portion 17, engaging the upper surface of the cover disk. Again, as shown in Fig. 8, the cover may be retained simply by an annular weight W of approximately the same outside diameter as the cover and resting loosely thereon, the ring being narrow enough to clear the seed apertures.

In practice, the testing units or cups are employed in sets as before explained. The number of units in a set may of course vary, but is ordinarily a dozen or more. When not in use, and especially when being shipped or transported, it is most convenient to remove the cover disks and to nest the cups comprising the set, the disks being kept stacked together. In this way, a complete testing apparatus takes up very little space and can be compactly packed and conveniently shipped to the user.

In using the testing apparatus illustrated in Figs. 1, 2 and 3 for testing soil, for example, enough moist soil, or soil mixed with a known quantity of fertilizer is placed in the test cup to fill it to substantially the level of the bead 13, or to the projections 15, or the feet of the clips 17, as the case may be. The cover disk is then secured in place, and a seed is inserted in each one of the apertures 14 and pushed down into the soil to a predetermined depth. This same procedure is followed in the case of the other testing cups of the set, care being taken of course to prepare each test cup in exactly the same way except for the variable factor, in this instance the fertilizer, for which comparative results are desired. The shallow space or receptacle above the cover disk may be filled with inert pulverulent material 17a, such as fine dry sand, either immediately after preparation of the test cups or after the seedlings 18 have made their appearance. Ordinarily it is preferable to provide the sand layer immediately, as this aids substantially in preventing change in moisture content of the soil sample due to exposure to the atmosphere through the apertures 14, without hindering growth of the seedling. The prepared test cups of the set are then placed side by side in a location such that they are all subjected to the same conditions of temperature, light, etc., and are left undisturbed for the entire period of the test, say two weeks. At the end of the test period, the seedlings in the various test cups can be compared readily, and the relative desirability of the various fertilizer additions to the soil being tested can be readily deduced. A complete record of the various test cups is kept, so that upon comparison of the seedlings, the particular soil mixture giving the best results can be immediately ascertained by reference to the record.

It is to be particularly noted that by reason of the fact that the test cups are entirely closed except for the seed apertures, and are made of material which is substantially impervious to air and moisture, variation in moisture content of the soil insofar as such variation would be affected by the atmosphere, is practically eliminated. This is one of the most troublesome factors to control in tests of this kind as conducted with testing devices heretofore available. In using the apparatus in the present invention, no water is added to the test cups at any time during the test, the soil originally placed in the cups being provided with a definitely ascertained amount of moisture at the outset, and this moisture remaining substantially constant throughout the test except for such changes as may be induced by the growth of the seedlings. The conditions for the comparative test are thus standardized to a greatly increased extent, and the test results are correspondingly more accurate and dependable than has usually been the case heretofore.

In Figs. 4 and 5 is illustrated a somewhat different form of test cup embodying, however, the same general principles as the form already described. In this instance, the test cup is designed to stand on its larger end, thus having somewhat greater stability than the cup previously described. In the form here shown, the frusto-conical cup body 20 is provided with a removable upper closure or cover 21, apertured for seed insertion as indicated at 22, and seating snugly in a peripheral groove formed by bead 23 a short distance below the upper edge of the cup. The bottom closure 24, which is the larger in this instance, is also removable, seating snugly in the peripheral groove provided by a bead 25 formed a short distance above the lower edge of the cup.

When this form of test cup is to be prepared for use, the cup is inverted with the bottom closure 24 removed as shown in Fig. 5, and a disk 26, of easily perforable material, such as tissue paper, is placed against the inner face of the aperture cover disk 21 to cover the seed aperturing 22. If preferred, this sheet 26, of paper or other material may be already pasted or otherwise secured to disk 21 as supplied to the user. With the cup in inverted position as described, it is filled with the soil sample substantially up to the level of the bead 25, and the bottom closure 24 is then sprung into its seating grooves, loss of soil through the seed apertures 22 being of course prevented by the protecting sheet 26. The test cup is now inverted into the position illustrated in Fig. 4, and is ready for sowing of the seed. This can readily be effected by puncturing or cutting out those portions of the tissue paper sheet covering the seed apertures, whereupon the seed may be inserted and the test completed as before described. It will be noted that in this form of the testing apparatus, the cups of a set may be nested when the bottom closures 24 are removed. In this respect, therefore, it equals in convenience the form of test cup illustrated in Figs. 1, 2 and 3. In addition, it has the further advantage of greater stability, as noted, and furthermore the rootlets of the seedlings are somewhat less restricted in their habit of growth by reason of the downwardly flaring shape of the cup.

Figure 7:
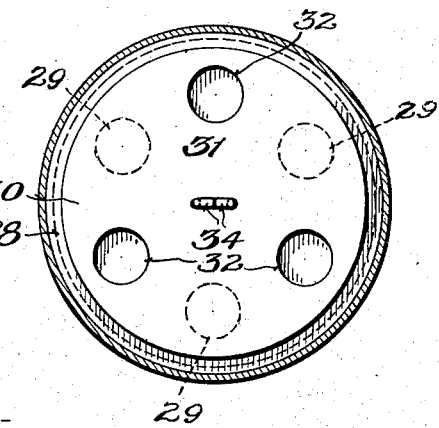
Fig. 7 is a detail of a closure device used in the construction of Fig. 6.

In Fig. 6 is illustrated another form of test cup which embodies several especially desirable features. In general form, this cup is similar to that illustrated in Fig. 4, that is, it is of the frusto-conical type and is intended to be used with the small end uppermost. Where the sides of the tested cup are smooth, however, there is a tendency for those roots of the seedlings which are near the side of the container to grow in a straight line downwardly between the soil and the container wall. This can be discouraged and practically prevented by forming the side walls of the container with irregularities such as corrugations 27, as shown in Fig. 6. This form of testing cup is also provided with a special type of cover provided as before with apertures for inserting seed, and also having attached thereto movable means whereby said apertures may be opened or closed as may be desired. The particular form of cover illustrated in Figs. 6 and 7 is particularly convenient and desirable. It consists of an outer disk 28, apertured as at 29 and adapted to be held in proper position at the upper end of the container in any suitable manner, in this instace by seating in the peripheral recess formed by the bead 30. On the under side of this outer disk is suitably secured an inner disk 31, which is somewhat smaller than the outer disk and which has apertures 32 which can be moved into and out of registry with apertures 29 of the outer disk by relative rotation of the disks. In this instance the inner disk is secured to the outer disk by means of a staple-like device which extends through both disks, presenting an operating head or ring 33 above the outer disk, and having its two points clinched into the inner disk on its under side, as indicated at 34. By this means, the inner disk can readily be rotated like a shutter to open or close the apertures 29. Thus, when the testing cup is to be filled with soil, it is inverted into a position corresponding to that shown in Fig. 5, the shutter disk 31 being turned to close the openings 29. The container is now filled with the proper amount of soil and the removable bottom closure 35 is replaced in the same manner as the bottom closure 24 shown in Fig. 4. The cup is then returned to the position shown in Fig. 6, and the shutter 31 turned by means of the operating ring or head 33 until the apertures 29 are again open. The cup is then ready for insertion of the seeds in the manner already described. By means of this arrangement, the double closure can be used for a number of tests, and the inconvenience of a separate closure sheet for the openings 29, while filling the container with soil, is avoided. It will be noted furthermore that this type of testing cup can also be readily nested, the closure bottom 35 being removable as before stated.

Figure 9:
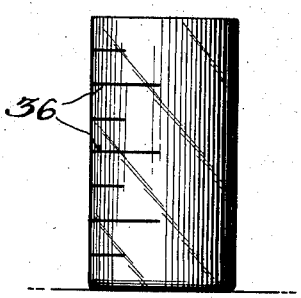
Fig. 9 is an elevational view illustrating a measuring device which may be employed in conjunction with any of the testing cups illustrated in the other figures.

In conjunction with any of the forms of test cups above described, it is convenient to use a standard measure of some kind for adding a known amount of each kind of fertilizer employed in the comparative tests to the respective samples of soil to be treated. For example, the measure may be selected so that for a given capacity of container, the addition of one measure full of fertilizer to the container full of soil represents the addition of 200 pounds of fertilizer to the acre, or any other desired figure. Such a measure is illustrated in Fig. 9 of the drawings, and in a particularly desirable embodiment of the invention, a complete testing apparatus comprises a plurality of testing cups of the character described above and also a measure such as shown in Fig. 9, having a predetermined volume relation to the component cups of the set. For convenience in using definite proportions of several fertilizers in one soil mixture to be tested, the measure device may be graduated as indicated at 36.

While the apparatus illustrated in the drawings and hereinbefore described in detail is typical of the best embodiments of my invention now known to me, it is to be understood that the invention is not limited to such specific details but comprises all such variations in form and construction as properly fall within the scope of the appended claims.

What I claim is:

1. A device for testing soil or seed comprising a closed frusto-conical container having its end walls formed by removable disks adapted to fit the container body snugly, one of said disks being apertured to permit insertion of seed when the container is charged with soil.

2. A device for testing soil or seed comprising a closed frusto-conical container having its end walls formed by removable disks adapted to fit the container body snugly, one of said disks being apertured to permit insertion of seed when the container is charged with soil, in combination with means for temporarily covering the aperturing of such disk.

3. A device for testing soil or seed comprising a closed frusto-conical container having its end walls formed by removable disks adapted to fit the container body snugly, the disk at the smaller end being apertured to permit insertion of seed when the container is charged with soil, in combination with a member cooperating with the apertured disk and movable to cover or uncover the aperturing thereof.

4. A device for testing soil or seed comprising a closed frusto-conical container having one end wall apertured to permit insertion of seed when the container is charged with soil, and having its other end wall removable, in combination with a shutter device, mounted on said apertured end wall and movable to cover or uncover the aperturing thereof.

5. A device for testing soil or seed comprising a closed frusto-conical container having its smaller end wall apertured to permit insertion of seed when the container is charged with soil, and having its other end wall removable, of a disk rotatably mounted on the inner face of the apertured end wall and similarly apertured, and means operable from the outside to rotate said disk and thereby to cover or uncover the aperturing of said disk.

6. A device for testing soil or seed comprising a container having a wall apertured for insertion of seed, and a shutter device movable to control such aperturing.

7. A device for testing soil or seed comprising a closed frusto-conical container having its larger end wall removable, and having one of its end walls apertured to permit insertion of seed into the container when charged with soil, said removable end wall being releasably fastened in position.

8. A device for testing soil or seed comprising a frusto-conical container adapted to stand on its larger end and having a removable bottom, and an apertured cover for said container, the side wall of the container having corrugations extending peripherally, substantially as described and for the purposes set forth.

In testimony whereof I hereunto affix my signature.

OSWALD CHARLES EARP-THOMAS.